United States Patent
Sarakoglou et al.

(10) Patent No.: US 9,719,868 B2
(45) Date of Patent: Aug. 1, 2017

(54) ELECTRONIC MEASUREMENT UNIT FOR A POLYMORPHOUS DEVICE FOR FORCE MEASUREMENT AND POLYMORPHOUS DEVICE INCLUDING THE SAME

(71) Applicant: FONDAZIONE ISTITUTO ITALIANO DI TECNOLOGIA, Genoa (IT)

(72) Inventors: Ioannis Sarakoglou, Genoa (IT); Nikos Tsagarakis, Genoa (IT); Darwin Caldwell, Genoa (IT)

(73) Assignee: Fondazione Instituto Italiano Di Tecnologia, Genoa (IT)

( * ) Notice: Subject to any disclaimer, the term of this patent is extended or adjusted under 35 U.S.C. 154(b) by 185 days.

(21) Appl. No.: 14/435,154

(22) PCT Filed: Oct. 11, 2013

(86) PCT No.: PCT/IB2013/059323
§ 371 (c)(1),
(2) Date: Apr. 10, 2015

(87) PCT Pub. No.: WO2014/057479
PCT Pub. Date: Apr. 17, 2014

(65) Prior Publication Data
US 2015/0233774 A1    Aug. 20, 2015

(30) Foreign Application Priority Data

Oct. 11, 2012  (IT) .............................. TO2012A0890

(51) Int. Cl.
*G01L 1/00*    (2006.01)
*G01L 3/00*    (2006.01)
*G01L 1/04*    (2006.01)

(52) U.S. Cl.
CPC ................ *G01L 1/005* (2013.01); *G01L 1/04* (2013.01); *G01L 3/00* (2013.01)

(58) Field of Classification Search
CPC .............. G01L 1/005; G01L 1/04; G01L 3/00
See application file for complete search history.

(56) References Cited

U.S. PATENT DOCUMENTS 3,904,234 A * 9/1975 Hill .......................... B25J 15/04
                                                      250/231.1
3,948,093 A * 4/1976 Folchi ...................... B25J 9/048
                                                      294/907

(Continued)

FOREIGN PATENT DOCUMENTS

| DE | 10 2005 033 527 A1 | 1/2007 |
| WO | WO 2005/015146 A1 | 2/2005 |
| WO | WO 2011/096367 A1 | 8/2011 |

OTHER PUBLICATIONS

PCT Notification of Transmittal of the International Search Report and the Written Opinion of the International Searching Authority, or the Declaration for PCT Counterpart Application No. PCT/IB2013/059323, 9 pp., (Apr. 22, 2014).

(Continued)

*Primary Examiner* — David Bolduc
(74) *Attorney, Agent, or Firm* — Blakely, Sokoloff, Taylor & Zafman LLP

(57) ABSTRACT

An electronic measurement unit for a polymorphous device, comprising a number of lateral structures, each lateral structure including: a support structure; at least one sensor constrained to the support structure and generating an electrical signal indicative of a deformation of the support structure; and a coupling structure that constrains a corresponding external covering element to the support structure in a releasable manner, so that when the external covering element is constrained to the support structure and an (Continued)

external force acts on the external covering element, the electrical signal is indicative of the external force.

10 Claims, 4 Drawing Sheets

(56) References Cited

U.S. PATENT DOCUMENTS

| | | | |
|---|---|---|---|
| 4,640,138 A | 2/1987 | Meyer et al. | |
| 4,763,531 A * | 8/1988 | Dietrich | G01L 5/161 73/862.044 |
| 5,365,799 A * | 11/1994 | Okada | G01L 1/16 73/862.041 |
| 5,490,427 A * | 2/1996 | Yee | G01L 5/161 73/767 |
| 5,526,700 A * | 6/1996 | Akeel | G01L 5/162 73/862.042 |
| 5,648,617 A * | 7/1997 | Cullen | G01L 5/226 73/862.042 |
| 5,889,214 A * | 3/1999 | Kang | G01L 5/161 73/862.043 |
| 6,622,575 B1 | 9/2003 | Nagata | |
| 7,028,540 B2 | 4/2006 | Morikawa | |
| 7,603,917 B2 * | 10/2009 | Graham | G01L 5/16 73/862.043 |
| 2002/0073786 A1 * | 6/2002 | Meyer | G01L 5/161 73/862.046 |
| 2009/0301217 A1 * | 12/2009 | Kurtz | G01L 3/1457 73/847 |
| 2012/0048027 A1 * | 3/2012 | Hashiguchi | B25J 9/0087 73/763 |
| 2012/0096952 A1 * | 4/2012 | Amano | B25J 13/083 73/862.046 |
| 2012/0144932 A1 * | 6/2012 | Ikebe | G01L 1/04 73/862.041 |
| 2012/0198945 A1 * | 8/2012 | Yoneyama | B25J 13/083 73/862.042 |
| 2013/0152700 A1 * | 6/2013 | Kamiya | B25J 9/00 73/862.043 |
| 2013/0152701 A1 * | 6/2013 | Oka | B25J 9/1633 73/862.044 |
| 2013/0233089 A1 * | 9/2013 | Kawai | B25J 13/085 73/862.68 |
| 2014/0041461 A1 * | 2/2014 | Ueno | G01L 5/16 73/862.625 |
| 2015/0266184 A1 * | 9/2015 | Arakawa | G01L 5/167 700/258 |

OTHER PUBLICATIONS

G. Mastinu, et al., "A New Six-axis Load Cell. Part I: Design", Experimental Mechanics, vol. 51, No. 3, pp. 373-388, (Mar. 2011).

S.M. Declercq, et al., "A Smart 6-DOF Load Cell Development", Society for Experimental Mechanics (SEM), Conference & Exposition on Structural Dynamics, pp. 844-853, (2002).

N.G. Tsagarakis, et al., "iCub: The Design and Realization of an Open Humanoid Platform for Cognitive and Neuroscience Research", Advanced Robotics, vol. 21, No. 10, pp. 1151-1175, (2007).

William D. Memberg, et al., "Instrumented Objects for Quantitative Evaluation of Hand Grasp", Journal of Rehabilitation Research and Development, vol. 34, No. 1, pp. 82-90, (Jan. 1997).

Gregorij Kurillo, et al., "Grip Force Tracking System for Assessment and Rehabilitation of Hand Function", Technology and Health Care, vol. 13, pp. 1-13, (2005).

Antonio Bicchi, et al., "Contact Sensing from Force Measurements", Massachusetts Institute of Technology Artificial Intelligence Laboratory, A.I. Memo No. 1262, 34 pp., (Oct. 1990).

* cited by examiner

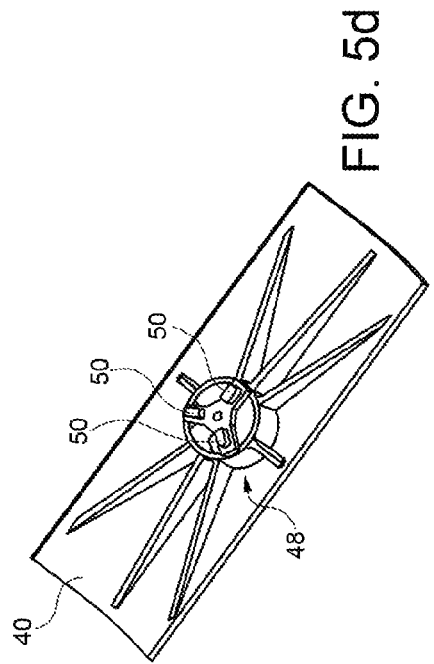
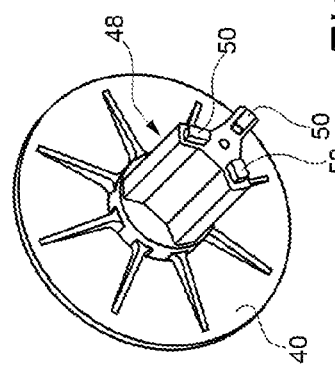
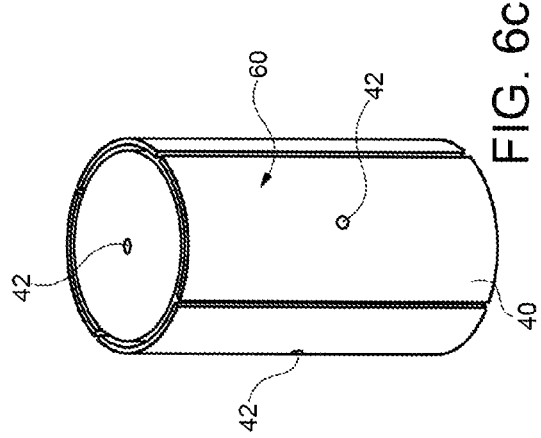
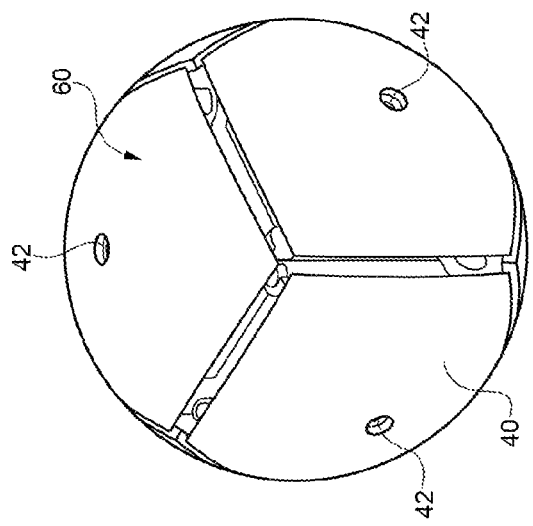
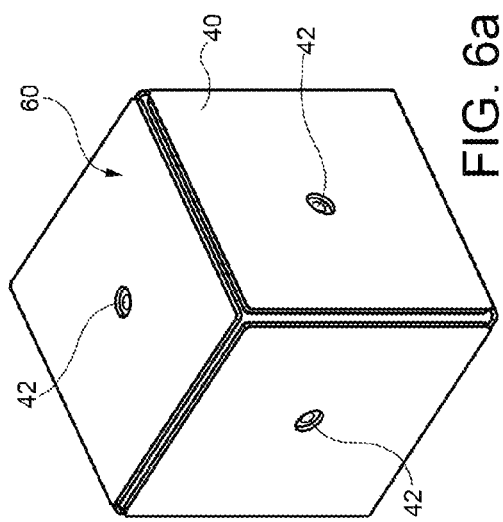

ELECTRONIC MEASUREMENT UNIT FOR A POLYMORPHOUS DEVICE FOR FORCE MEASUREMENT AND POLYMORPHOUS DEVICE INCLUDING THE SAME

CROSS-REFERENCE TO RELATED APPLICATIONS

This patent application is a U.S. National Phase Application under 35 U.S.C. §371 of International Application No. PCT/IB2013/059323, filed Oct. 11, 2013, entitled ELECTRONIC MEASUREMENT UNIT FOR A POLYMORPHOUS DEVICE FOR FORCE MEASUREMENT AND POLYMORPHOUS DEVICE INCLUDING THE SAME, which claims priority to Italian Patent Application No. TO2012A000890, filed Oct. 11, 2012.

FIELD

The present invention relates to an electronic measurement unit for a polymorphous device for force measurement and a polymorphous device including this electronic measurement unit.

BACKGROUND

As is known, there is a need to measure force and/or torque in numerous fields of application. To this end, for example, so-called six-axis load cells are available, as described for example by G. Mastinu, M. Gobbi and G. Previati in "A new six-axis load cell. Part I: design", Experimental Mechanics 51: 373-388 (2011), or in patent WO2005/015146. Further examples of six-axis load cells, also known as load cells with six degrees of freedom, are described by S. M. Declercq, D. R. Lazor and D. L. Brown in "A smart 6-DOF load cell development", Society for Experimental Mechanics (SEM), International Modal Analysis Conference XX, and by N. G. Tsagarakis, G. Metta, et al. in "iCub: the design and realization of an open humanoid platform for cognitive and neuroscience research", Advanced Robotics, vol. 21, no. 10, pages 1151-1175 (2007).

In general, a six-axis load cell, which will henceforth be referred to as a load cell for brevity, is an electronic system designed to provide the measurements of three components of a force acting on the electronic system, these three components being measured with respect to a reference system of the load cell. In addition, the load cell is designed to provide the measurements of three components of torque acting on the load cell, these three components also being measured with respect to the reference system of the load cell.

In detail, the load cell has three radial arms, which are made in one piece and arranged such that pairs of radial arms form angles of 120°. Each radial arm extends from a central portion, made in one piece with the radial arms. In addition, the load cell comprises a frame, which encircles the radial arms.

In greater detail, each radial arm has a first end, which is connected to the central portion, and a second end, opposite to the first end and constrained to the frame. Furthermore, one or more sensors are mounted on each radial arm that are capable of detecting the deformation to which the associated radial arm is subjected following application of the aforesaid force and torque.

In particular, there are known load cells in which each radial arm substantially has the shape of a parallelepiped and in which a corresponding strain gauge is arranged on each face of the parallelepiped. Considering a radial arm and the four corresponding strain gauges, two of the four strain gauges, arranged on opposite faces of the radial arm, are electrically connected to a first pair of fixed resistors, so as to form a first Wheatstone bridge, of the so-called half-bridge type. Furthermore, the other two strain gauges are connected to a second pair of fixed resistors, so as to form a second Wheatstone bridge, this also of the so-called half-bridge type.

The strain gauges are electrically connected to a processing unit. In addition, each strain gauge provides an electrical signal indicative of a corresponding local stress.

Based on the signals supplied by the strain gauges and the (known) shape of the radial arms, the processing unit is capable of determining a corresponding local vector, formed by three pairs of local forces. Each pair of local forces includes a first and a second local force, which are orthogonal to each other and act on a corresponding radial arm. In particular, given a radial arm, the corresponding first and second local forces are the constraining reactions to which the radial arm is subjected to where it is constrained to the frame.

Based on the local vector, the processing unit is also capable of determining the aforesaid three components of the force acting on the load cell, as well as the aforesaid three components of the torque acting on the load cell, this force and torque acting on the geometric centre of the load cell. The reference system with respect to which this force and torque are calculated usually coincides with the reference system of the load cell's frame.

That having been said, in numerous fields of application there is a need for measuring the forces that are exerted when gripping an object. For example, there is a need for measuring the forces exerted by a human being or a robot when handling an object.

For example, the article by W. D. Memberg and P. E. Crago, "Instrumented objects for quantitative evaluation of hand grasp", Journal of Rehabilitation Research and Development 34(1), pages 82-90, 1997 and the article by G. Kurillo, M. Gregoric, et al., "Grip force tracking system for assessment and rehabilitation of hand function", Technology and Health Care 13(3), pages 137-149, 2005, describe electronic devices designed to measure the forces applied during a hand grasp.

Patent application WO2011/096367 describes a floor reaction force measuring device, which is constrained beneath the sole of a user's foot. The device comprises a first unit, suitable for being constrained close to the heel and a second unit, suitable for being constrained close to the big toe; both the first and the second units comprise three reaction force sensors, which are arranged in a planar manner.

Thus, referring to gripping forces to indicate the forces generated when an object is handled by a user, whether a human being or a mechanical device, the electronic devices of known type are characterized by the capacity to measure gripping forces quite accurately. However, these electronic devices have low flexibility of use, as each one of them is designed according to a corresponding grip mode; in other words, each electronic device has a shape that is predefined according to the expected use, i.e. depending on the manner in which the user is expected to handle the device. Possible variations with respect to the expected uses therefore entail profound changes to the electronic devices, and in particular to the respective electronic circuitry.

SUMMARY

The object of the present invention is to provide a force measuring device that at least partially solves the drawbacks of the known art.

In accordance with the invention, an electronic unit and a force measuring device are provided as defined in the appended claims.

BRIEF DESCRIPTION OF THE DRAWINGS

For a better understanding of the invention, some embodiments will now be described, purely by way of non-limitative example and with reference to the attached drawings, where:

FIGS. 5a-5d show perspective views of examples of external covering elements of the present polymorphous device; and FIGS. 6a-6c show perspective views of some embodiments of the present polymorphous device, when assembled.

DETAILED DESCRIPTION

The present polymorphous device is essentially formed by a central electronic unit that can be mechanically coupled to a plurality of external covering elements, which form a structure arranged externally with respect to the central electronic unit and that is suitable for being grasped, or in any case handled. The external covering elements are available with different shapes, so that the external structure can assume different shapes, according to needs, without it being necessary to replace or modify the central electronic unit. The present polymorphous device therefore forms a modular structure, which enables changing the geometry of a surface suitable for interacting, for example, with the hand of a user, without it being necessary to modify the underlying electronics.

Figure 1:
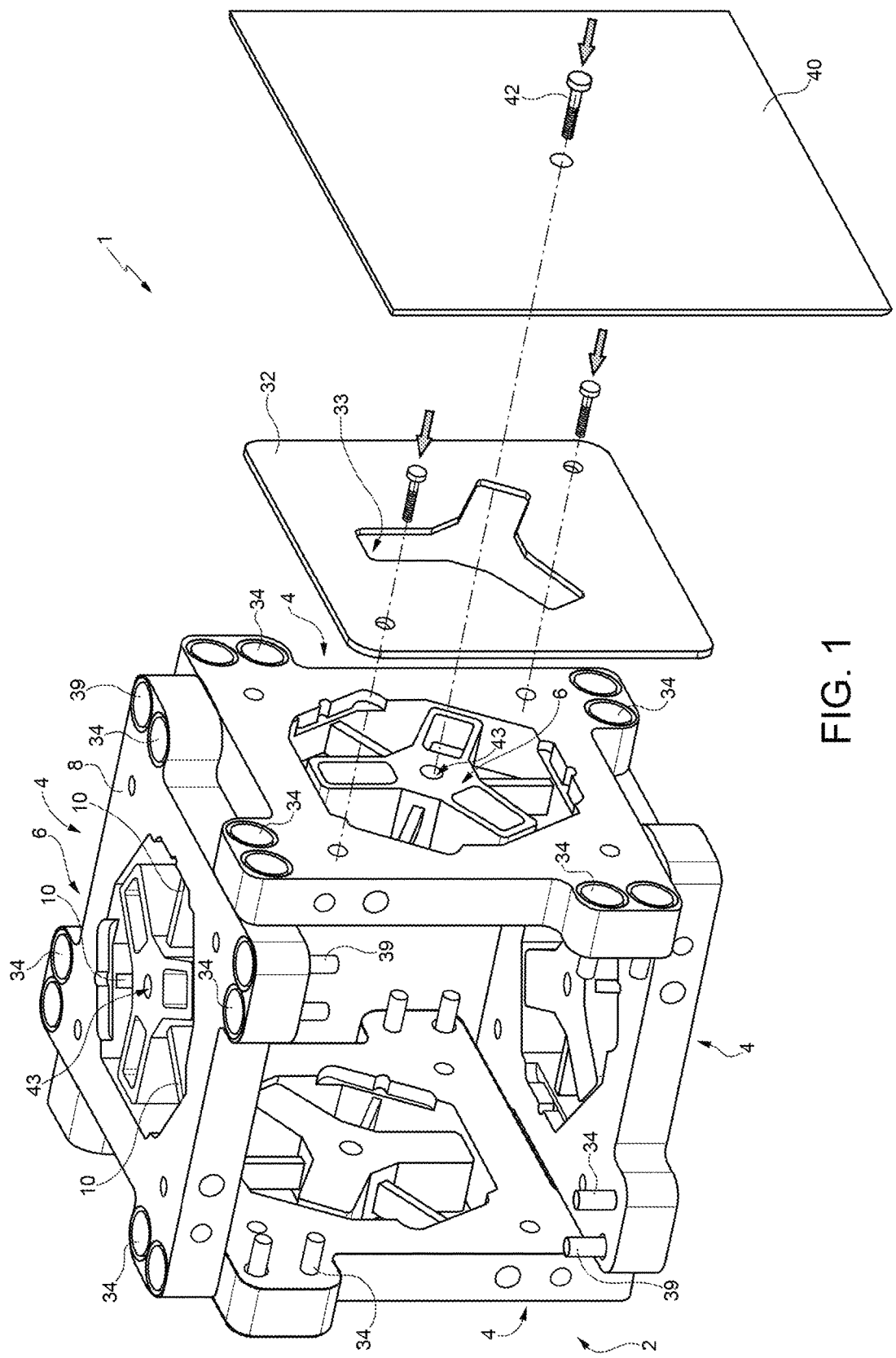
FIG. 1 schematically shows a perspective view, with portions removed, of an embodiment of the present polymorphous device.

That having been said, FIG. 1 shows the present polymorphous device, indicated as a whole by reference numeral 1.

The polymorphous device 1 comprises the aforesaid central electronic unit 2, which in turn comprises six lateral structures 4 (only four lateral structures are shown in FIG. 1).

Each lateral structure 4 comprises a corresponding load cell 6, which is of a type in itself known.

Each load cell 6 comprises, in a manner which is in itself known, a closed support element 8, which acts as a frame, and inside which three spokes 10 extend, formed in one piece and arranged so as to define three pairs of spokes, each pair of spokes forming an angle of 120°. In practice, the closed support element 8 circumscribes the three spokes 10; furthermore, each spoke 10 has a parallelepipedal shape and is constrained, at a corresponding end, to the closed support element 8. For example, in the embodiment shown in FIG. 1, the spokes 10 form one piece with the closed support element 8.

Figure 2:
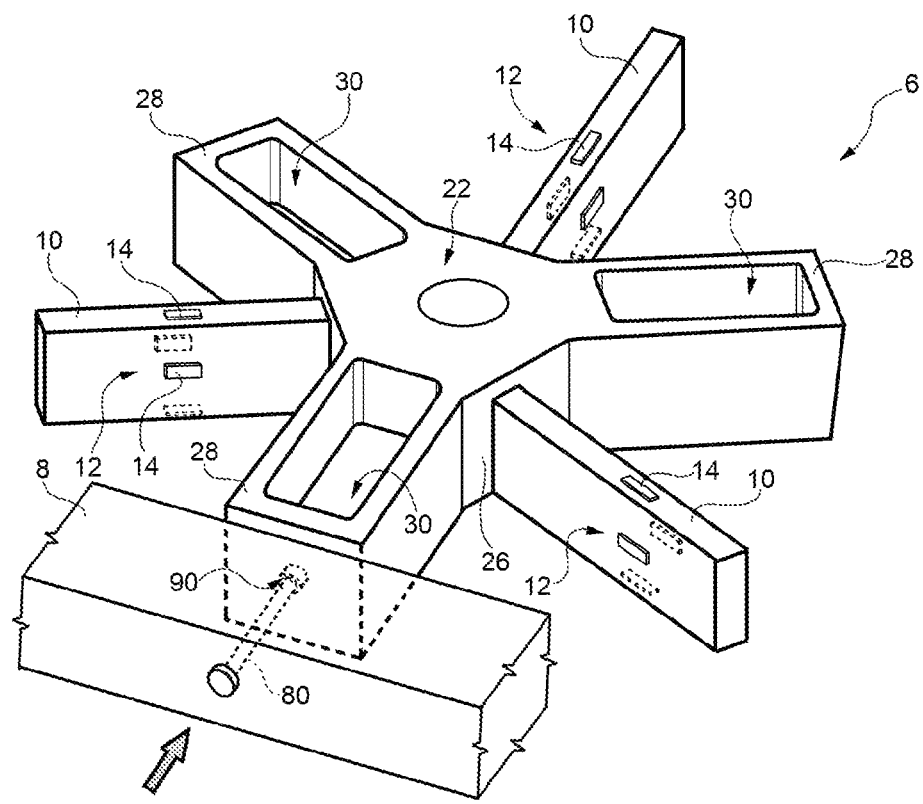
FIG. 2 schematically shows a perspective view of a portion of a further embodiment of the present polymorphous device.

As shown in FIG. 2, even if with reference to a different embodiment, each spoke 10 is fitted with, in a manner in itself known, a corresponding sensor system 12, which includes, for example, four strain gauges 14 able to provide electrical signals indicative of corresponding local stresses on the spoke 10.

The central electronic unit 2 also comprises a processing unit (FIG. 3), which is connected to the sensor systems 12. Thus, the processing unit 20 is shared between the six load cells 6.

Considering any lateral structure 4, the processing unit 20 is capable of determining, on the basis of the electrical signals supplied by the three corresponding sensor systems 12 and in a manner in itself known, a corresponding lateral structure vector, which includes the three components of the force acting on the corresponding load cell 6, as well as the three components of the torque acting on this load cell 6, this force and torque acting at the geometric centre of the load cell 6. For example, the six components of any local structure vector are determined such that they refer to the support element 8, and so that they are null when the aforesaid force and torque acting at the geometric centre of the load cell 6 are null.

Again, with reference to the lateral structures 4, each of them comprises a central region 22 (FIG. 2). The geometric centre of each load cell 6 is therefore the centroid of the solid formed by the three corresponding spokes 10 and the corresponding central region 22.

The central region 22 forms the central portion 26 of the corresponding load cell 6, i.e. the portion from which the spokes 10 of the load cell 6 extend.

The central region 22 also forms three internal coupling regions 28, which form one piece with the central portion 26, and therefore with the spokes 10, and are arranged so as to define three pairs of internal coupling regions 28, each pair forming an angle of 120°. Furthermore, the internal coupling regions 28 are arranged such that each one of them is radially arranged between a corresponding pair of spokes 10 and is set apart from each of these spokes by an angular distance of 60°. In addition, each internal coupling region 28 delimits a corresponding upward-facing blind internal cavity 30.

Each lateral structure 4 also comprises a respective protective layer 32, which is constrained to the corresponding closed support element 8, overlies the corresponding load cell 6 and defines a pass-through upper opening 33, which overlies the internal cavities 30, so as to give access to the internal cavities 30 from the outside. For simplicity, only one protective layer 32 is shown in FIG. 1.

Each protective layer 32 performs the function of protecting the underlying portions during the phases of assembly and handling of the central electronic unit 2.

The six lateral structures 4 are constrained such that the central electronic unit 2 assumes the form of a cube, the faces of which are formed precisely by the lateral structures 4. To this end, considering any one of the lateral structure 4, this is constrained to the four lateral structures 4 adjacent to it.

In detail, considering any lateral structure 4, this is constrained to each between the four lateral structures adjacent to it by using a corresponding coupling screw 34.

In greater detail, assuming to refer, for example, to a first lateral structure (shown in FIG. 4, where it is indicated by reference numeral 4'), which is arranged, for example, above a second lateral structure (indicated by reference numeral 4" in FIG. 4), the closed support elements of the first and the second lateral structures 4' and 4" (respectively indicated by reference numerals 8' and 8") respectively form a first threaded hole 35 and a first unthreaded hole 36, which are aligned with one another, the first threaded hole 35 being pass-through and communicating with the first unthreaded hole 36. The first threaded hole 35 has a smaller diameter than the first unthreaded hole 36. In addition, the coupling screw (indicated by reference numeral 34') extends through the first threaded hole 35 and the first unthreaded hole 36. More specifically, the coupling screw 34' is such as to engage the first threaded hole 35, making direct contact with the first threaded hole 35; furthermore, the coupling screw 34' is such that it engages, with play, the first unthreaded hole 36, i.e. not in contact with the walls of the first unthreaded hole 36. In other words, only the first threaded hole 35 is coupled with the coupling screw 34', and is therefore fastened to just the closed support element 8' of the first lateral structure 4', and is substantially equivalent to a so-called press-fit pin. Nevertheless, with respect to a press-fit pin, the coupling screw 34' is characterized by easier removal and insertion.

As what has been said regarding the first lateral structure 4' is also valid for the all the other lateral structures 4 of the central electronic unit 2, and considering that the six lateral structures 6 form a polyhedral solid complete with all its faces (and therefore closed), the lateral structures 4 are consequently all constrained by each other, so as to assure the assembly of the central electronic unit 2. Furthermore, the central electronic unit 2 is assembled so as to reduce stresses inside the central electronic unit 2, these stresses generally being caused by tolerance and misalignments between the mechanical parts of the central electronic unit 2. In particular, the stresses to which the closed support elements 8, and therefore also the spokes 10, are subjected following assembly of the central electronic unit 2, are reduced. In this way, the possibility that residual stresses caused by assembly of the central electronic unit 2 can falsify the electrical signals supplied by the sensor systems 12, generating corresponding offsets, is reduced. In this way, improved precision of the polymorphous device 1 is achieved. In addition, in the case where the polymorphous device 1 is subjected to load cycles, the possibility is also reduced that these load cycles can cause an accumulation of mechanical stress inside the central electronic unit 2, with consequent generation of hysteresis in the force measurements.

Advantageously, the assembly of the central electronic unit 2 by means of the coupling screws 34 can take place by using preliminary screws 39.

In particular, referring again, for example, to the first and second lateral structures 4' and 4", the closed support elements 8', 8" of the first and second lateral structure 4' and 4" respectively form a second unthreaded hole 37 and a second threaded hole 38, which are aligned with one another, the second unthreaded hole 37 being pass-through and communicating with the second threaded hole 38. The second threaded hole 38 has a smaller diameter than the second unthreaded hole 37. In this way, before inserting the coupling screw 34' inside the first threaded hole 35 and the first unthreaded hole 36, it is possible to insert a preliminary screw 39, so that it passes through the second unthreaded hole and the second threaded hole 38. In particular, the preliminary screw 39 passes in the second unthreaded hole 37 with play, while it couples with the second threaded hole 38. Furthermore, the head of the preliminary screw 39 touches the closed support element 8' of the first lateral structure 4', so as to constrain it to the closed support element 8" of the second lateral structure 4".

After having fastened the preliminary screw 39, the first and second lateral structures 4' and 4" are fastened to one another and so insertion of the coupling screw 34' is facilitated. Once the coupling screw 34' is inserted, the preliminary screw 39 is removed. In FIG. 1, purely by way of example, the preliminary screws 39 are also shown, although, as explained, they are preferably absent once assembly of the central electronic unit 2 is finished.

Figure 4:
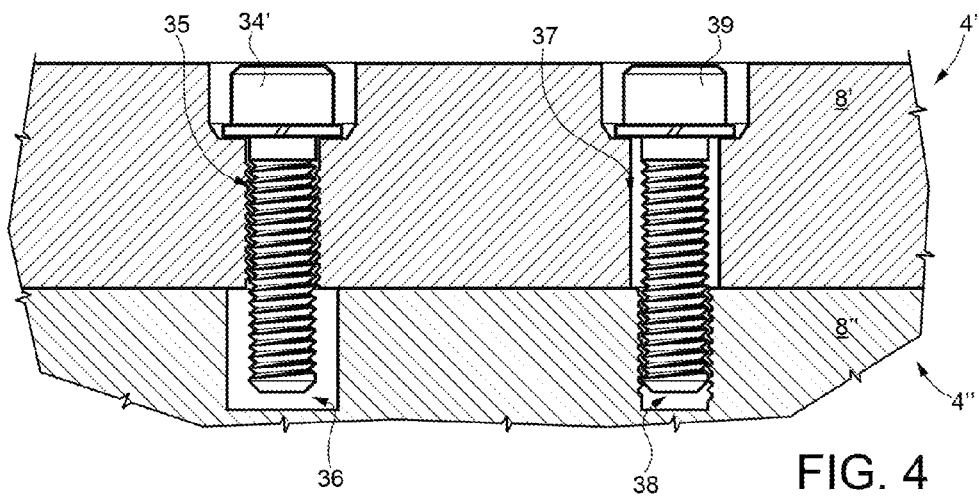
FIG. 4 shows a cross-section of a portion of the present polymorphous device, during a phase of assembly.

As shown in FIGS. 1 and 4, given any lateral structure 4, the coupling screws 34 and the preliminary screws 39 are parallel to one another and are arranged so as to form four pairs of screws, each pair being arranged close to a respective vertex of a square defined by the corresponding closed support element 8.

Independently of the details regarding the assembly of the central electronic unit 2, the polymorphous device 1 comprises six external covering elements 40 (FIGS. 5a-5d), each of which is electrically passive and suitable for being mechanically coupled to a corresponding lateral structure 4, and therefore to a corresponding load cell 6. In particular, each external covering element 40 can be coupled to the corresponding central region 22, by using a fastening screw 42. To this end, each central region 22 forms a fastening cavity 43, which is threaded and can be engaged by a corresponding fastening screw 42. Furthermore, the geometric centre of each load cell 6 falls within the corresponding fastening cavity 43.

Figure 5A:
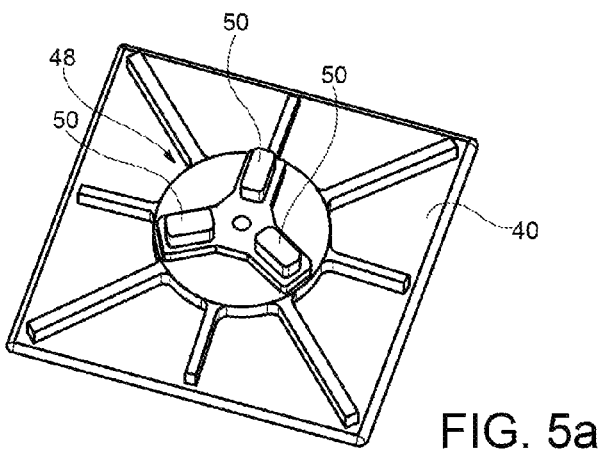
Figure 5B:
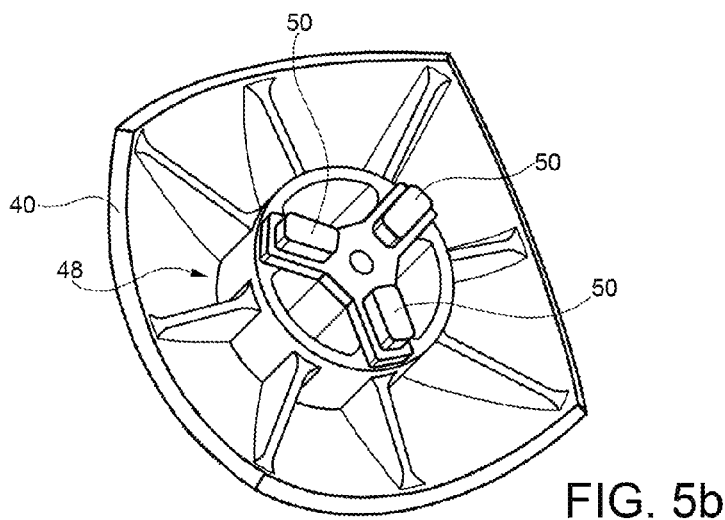

In greater detail, as shown in FIGS. 5a-5d, embodiments are possible in which the outer surfaces of the external covering elements 40, i.e. the surfaces that, in use, do not face towards the central electronic unit 2, have a shape that can be chosen from: squares (FIG. 5a), portions of a sphere (FIG. 5b), circles (FIG. 5c) and portions of a cylinder (FIG. 5d).

Furthermore, independently of the shape of its outer surface, each external covering element 40 forms an external coupling region 48, which faces towards the corresponding lateral structure 4 when the external covering element 40 is coupled to the central electronic unit 2. The external region 48 extends through the upper opening 33 defined by the corresponding protective layer 32, to couple with the underlying central region 22.

In particular, the external coupling region 48 forms three protrusions 50, each of which has a parallelepipedal shape and can be housed inside a corresponding internal cavity 30, when the external covering element 40 is coupled to the central electronic unit 2, thus touching the internal coupling regions and therefore the central region 22. The protrusions 50 also enable easily aligning the external covering element 40 with the underlying lateral structure 4, so that it assumes a predetermined position with respect to the latter.

Coupling external covering elements 40 of opportune shape to the central electronic unit 2 produces a contact surface 60 of the polymorphous device 1, which is formed by the set of outer surfaces of the external covering elements 40 and, unlike the underlying central electronic unit 2, can be directly manipulated by a user. Therefore, the contact surface 60 prevents the user from accessing the central electronic unit 2; in addition, the contact surface 60 is at least locally curved.

As shown purely by way of example in FIGS. 6a-6c, the contact surface 60 can assume a shape chosen from a cubical surface, a spherical surface and a cylindrical surface. Purely by way of example, the cubical surface may have a side 5 cm long; the spherical surface may have a diameter of 7 cm, and the cylindrical surface may have a diameter of 7 cm and a length of 12 cm. In addition, the overall weight of the polymorphous device 1 is, for example, less than three hundred grams.

In use, assuming that a user touches the contact surface 60, and therefore applies an external force at a point of contact of a given external covering element 40, this external covering element 40, in turn, transmits a force to the corresponding load cell 6, through the corresponding fastening screw 42 and its protrusions 50. The processing unit 20 then determines the corresponding lateral structure vector, on the basis of the electrical signals supplied by the corresponding load cell 6. This lateral structure vector comprises three components of an internal force, which acts on the geometric centre of the corresponding load cell 6, as well as the three components of the torque acting on the geometric centre of that load cell 6.

The processing unit 20 is further configured to determine, on the basis of the aforesaid lateral structure vector and the (known) shape of the external covering element 40, the point of contact, as well as the external force. To this end, the processing unit 20 can implement the algorithms described, for example, by A. Bicchi, J. K. Salisbury, et al., in "Contact Sensing from Force Measurements", International Journal of Robotics Research 12, pages 249-252, or the algorithms implemented in so-called force plates.

The processing unit is then able to determine, for each external covering element 40, an external force applied to it, as well as the corresponding point of application. In the case where multiple external forces are applied to a given external covering element 40, the processing unit 20 determines the net force.

Information regarding the quantities determined by the processing unit 20 is made available, for example, to an external computer (not shown), to which the electronic processing unit 20 can be connected.

Figure 3:
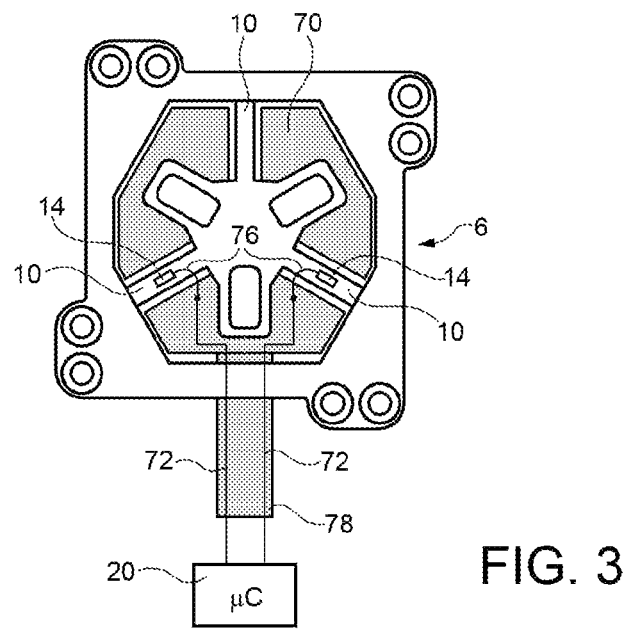
FIG. 3 schematically shows a top view of a portion of the embodiment shown in FIG. 1.

In greater detail, as shown in FIG. 3, the central electronic unit 2 comprises, for each load cell 6, a printed-circuit board (PCB) 70, which is soldered onto the central portion 26 and the internal coupling regions 28 of the load cell 6, in order to achieve greater constructional simplicity. The PCB 70 has conductive tracks 72 that are electrically connected to the strain gauges 14 inside the sensor systems 12 by the interposition of conductive wires 76. Purely by way of example, two strain gauges 14, two conductive tracks 72 and two conductive wires 76 are shown in FIG. 3.

The PCB 70 further comprises a flexible bus 78, inside which the conductive tracks 72 run. The flexible bus 78 is in turn connected to the processing unit 20, so as to electrically connect the strain gauges 14 to the processing unit 20 in a simple and reliable manner. In this way, possible maintenance and disassembly operations on the central electronic unit 2, as well as routing operations on the electrical paths, are also facilitated.

As shown again in FIG. 2, embodiments are also possible in which each load cell 6 comprises three protection pins 80, each of which corresponds to a respective internal coupling region 28. For simplicity, only one protection pin 80 is shown in FIG. 2.

In particular, given an internal coupling region 28, the corresponding protection pin 80 passes through the corresponding closed support element 8, inside which it is press fitted. Furthermore, the protection pin 80 protrudes beyond the closed support element 8, so as to extend inside a protective cavity 90 formed inside the internal coupling region 28 and different from the internal cavity 30 defined by the same internal coupling region 28. The protective cavity 90 is a cylindrically shaped blind hole, with a diameter such that when the load cell 6 is not deformed, the protection pin 80 extends with play inside the protective cavity 90. Therefore, in the absence of deformation, or in the presence of deformations below a threshold value, the protection pin 80 does not touch with the corresponding internal coupling region 28. Instead, in the case where the load cell 6 deforms beyond the aforesaid threshold value, the protection pin 80 touches the walls of the protective cavity 90, and therefore becomes coupled with the internal coupling region 28, preventing, or in any case limiting, further deformation of this internal coupling region 28, and therefore of the load cell 6. In this way, overload situations that could damage the load cell 6 are avoided.

The advantages that can be achieved with the present polymorphous device emerge clearly from the foregoing description.

In particular, the present polymorphous device has a single electronic unit, which can be coupled with different external covering elements, so as to produce an interaction surface having opportune geometry, according to needs, without modifying the underlying electronic unit. The present polymorphous device is therefore characterized, amongst other things, by low operating costs and high flexibility of use. Furthermore, the present polymorphous device enables determining the forces and torques acting on the device, as well as the corresponding points of application of these forces.

Finally, it is clear that modifications and variants may be made to the present polymorphous device and the electronic unit, without departing from the scope of the present invention, as defined by the appended claims.

For example, the central electronic unit could be formed by a different number of lateral structures. For example, the central electronic unit could be formed by four lateral structures, arranged so as to form a tetrahedron. Furthermore, instead of the coupling screws, corresponding pins could be present. In general, it is possible that the lateral structures form the faces of any polyhedral solid, preferably, but not necessarily, complete with all of its faces.

Still with reference to the central electronic unit, this could be equipped with inertial sensors and/or accelerometers for the purpose of providing further information regarding the manipulation of the polymorphous device. Furthermore, the central electronic unit could comprise a battery and a wireless communications module to enable transmission of the data it has computed.

With regard to the external covering elements, these may be coarse, at least in part, to facilitate grasping. In addition, they may be made, at least in part, of a polymeric material. Moreover, one or more external covering elements may be formed, at least in part, by tactile sensors, for example of a type chosen from: resistive, conductive, capacitive, piezoelectric, barometric, etc. In this case, each tactile sensor can function in on/off mode, so as to enable the detection of multiple contact points, or in continuous mode, in order to measure the pressure exerted during grasping.

With regard to the load cells, these may be of a different type. Each one of them may therefore comprise a different number of spokes and sensor systems of a different type; for example, each load cell may include a different number of strain gauges, which may also be connected in a different manner to that described. Thus, embodiments are possible, for example, in which each load cell comprises only six strain gauges, which provide six electrical signals indicative of the applied load and defining a measurement with six degrees of freedom.

Furthermore, the internal coupling regions and the external coupling regions may be absent, or in any case may have different shapes and arrangements with respect to that shown and described. It is also possible that one or more load cells are substituted by different sensors, which are, in any case, capable of generating electrical signals indicative of deformation of the corresponding support structures.

Finally, with regard to the modes of using the present polymorphous device, an external covering element may be made integral with a fixed surface (not shown), in which case the polymorphous device provides measurements of the forces and torques applied to the device, with reference to the fixed surface, these measurements being provided by the load cell that corresponds to the external covering element made integral with the fixed surface. Alternatively, the polymorphous device could be used to form a complex system suitable for being manipulated by several users.

What is claimed is:

1. An electronic measurement unit for a polymorphous device for the measurement of a hand grasp, comprising a number of lateral structures, each lateral structure comprising:
   a support structure;
   at least one sensor constrained to the support structure and configured to generate an electrical signal indicative of a deformation of said support structure; and
   a coupling structure configured to constrain a corresponding user-manipulable external covering element to said support structure in a releasable manner, so that when said corresponding external covering element is constrained to said support structure and an external force acts on said corresponding external covering element, said electrical signal is indicative of said external force;
   wherein the lateral structures are arranged so as to form a polyhedron, and wherein each lateral structure is coupled to a number of lateral structures adjacent to it by means of corresponding connection elements, each connection element being coupled to the support structure of the lateral structure and partially extending, with play, inside a housing cavity formed inside the support structure of the corresponding adjacent lateral structure.

2. The electronic unit according to claim 1, wherein said connection elements are screws, and wherein the support structure of each lateral structure forms, for each adjacent lateral structure, a respective threaded cavity, which communicates with the corresponding housing cavity, the screw that extends with play inside said corresponding housing cavity being coupled to said respective threaded cavity.

3. An electronic measurement unit for a polymorphous device for the measurement of a hand grasp, comprising a number of lateral structures, each lateral structure comprising:
   a support structure;
   at least one sensor constrained to the support structure and configured to generate an electrical signal indicative of a deformation of said support structure; and
   a coupling structure configured to constrain a corresponding user-manipulable external covering element to said support structure in a releasable manner, so that when said corresponding external covering element is constrained to said support structure and an external force acts on said corresponding external covering element, said electrical signal is indicative of said external force;
   wherein the electronic measuring unit further comprises a processing unit connected to the sensors and configured to determine, for each lateral structure, a measurement of the external force acting on the corresponding external covering element;
   wherein the processing unit is further configured to determine, for each lateral structure, the point of application of the external force acting on the corresponding external covering element;
   wherein each lateral structure forms a respective six-axis load cell, which includes a plurality of spokes, connected to each other and circumscribed by a support frame to which they are constrained; and
   wherein said processing unit is further configured to determine, for each lateral structure, a corresponding vector formed by three components of an internal force and three components of a torque, said internal force and torque acting at a point of the support structure of the lateral structure and being caused by the external force acting on the corresponding external covering element.

4. The electronic unit according to claim 3, wherein the processing unit is configured to determine, for each lateral structure, said measurement of the external force acting on the corresponding external covering element and the point of application of said corresponding external force, based on the corresponding vector.

5. The electronic unit according to claim 3, wherein each load cell comprises a plurality of strain gauges, and further comprising, for each load cell, a corresponding printed-circuit board, the strain gauges of each load cell being electrically connected to the processing unit through interposition of the corresponding printed-circuit board.

6. The electronic unit according to claim 3, wherein each support structure forms a corresponding central region, to which the corresponding spokes are constrained, said central region forming a number of coupling cavities configured to house corresponding protrusions of the corresponding external covering element, said coupling cavities being radially spaced out with respect to said corresponding spokes.

7. The electronic unit according to claim 6, wherein each central region forms a number of internal coupling regions, each of which forms a corresponding coupling cavity, said electronic unit further comprising at least one protective element, constrained to one of the support frames and partially extending, with play, inside a protective cavity formed in a corresponding internal coupling region, so that the protective element touches the walls of the protective cavity if said corresponding internal coupling region locally deforms beyond a deformation threshold, thereby preventing further deformation of said corresponding internal coupling region.

8. A polymorphous device for the measurement of a hand grasp, comprising an electronic measuring unit comprising a number of lateral structures, each lateral structure comprising:
   a support structure;
   at least one sensor constrained to the support structure and configured to generate an electrical signal indicative of a deformation of said support structure; and
   a coupling structure configured to constrain a corresponding user-manipulable external covering element to said support structure in a releasable manner, so that when said corresponding external covering element is constrained to said support structure and an external force acts on said corresponding external covering element, said electrical signal is indicative of said external force;

and a plurality of external covering elements, which are configured to form, when constrained to the corresponding support structures, a user-manipulable contact surface.

9. The polymorphous device according to claim 8, wherein the external covering elements are such that said contact surface is configured to prevent the user from accessing the electronic measurement unit.

10. A polymorphous device for the measurement of a hand grasp, comprising an electronic measuring unit comprising a number of lateral structures, each lateral structure comprising:

a support structure;

at least one sensor constrained to the support structure and configured to generate an electrical signal indicative of a deformation of said support structure; and a coupling structure configured to constrain a corresponding user-manipulable external covering element to said support structure in a releasable manner, so that when said corresponding external covering element is constrained to said support structure and an external force acts on said corresponding external covering element, said electrical signal is indicative of said external force, further comprising a processing unit connected to the sensors and configured to determine, for each lateral structure, a measurement of the external force acting on the corresponding external covering element, wherein the processing unit is further configured to determine, for each lateral structure, the point of application of the external force acting on the corresponding external covering element, wherein each lateral structure forms a respective six-axis load cell, which includes a plurality of spokes, connected to each other and circumscribed by a support frame to which they are constrained; and wherein said processing unit is further configured to determine, for each lateral structure, a corresponding vector formed by three components of an internal force and three components of a torque, said internal force and torque acting at a point of the support structure of the lateral structure and being caused by the external force acting on the corresponding external covering element, wherein each support structure forms a corresponding central region, to which the corresponding spokes are constrained, said central region forming a number of coupling cavities configured to house corresponding protrusions of the corresponding external covering element, said coupling cavities being radially spaced out with respect to said corresponding spokes, wherein each central region forms a number of internal coupling regions, each of which forms a corresponding coupling cavity, said electronic unit further comprising at least one protective element, constrained to one of the support frames and partially extending, with play, inside a protective cavity formed in a corresponding internal coupling region, so that the protective element touches the walls of the protective cavity if said corresponding internal coupling region locally deforms beyond a deformation threshold, thereby preventing further deformation of said corresponding internal coupling region, further comprising a plurality of external covering elements which are configured to form, when constrained to the corresponding support structures, a user-manipulable contact surface; and wherein each of said external covering elements forms a number of protrusions configured to couple with said coupling cavities, so that the external covering element assumes a predetermined position with respect to the corresponding support structure.

* * * * *